Sept. 4, 1934.  C. BOGART  1,972,084
EXPANSION JOINT
Filed Sept. 11, 1933
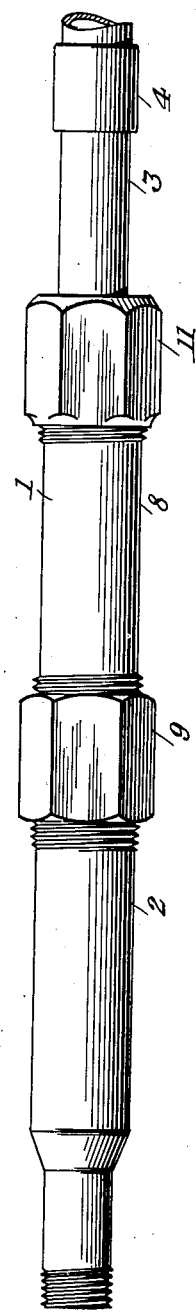
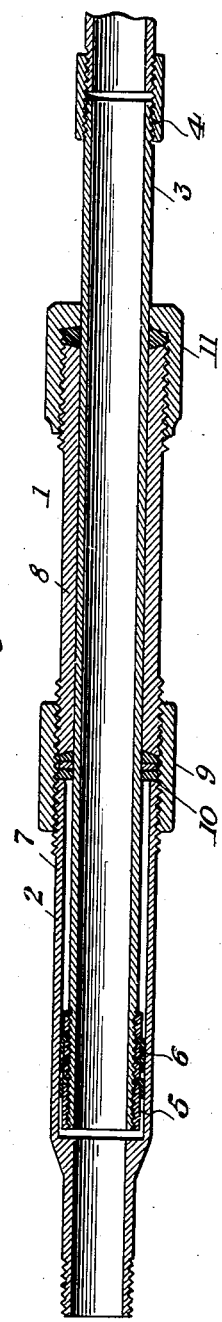
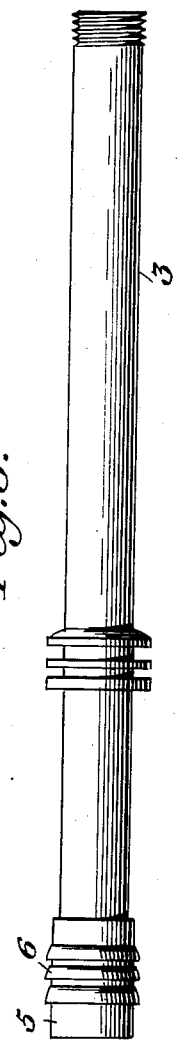
Clyde Bogart
INVENTOR
BY Victor J. Evans & Co.
ATTORNEYS Patented Sept. 4, 1934

1,972,084

UNITED STATES PATENT OFFICE 1,972,084

EXPANSION JOINT

Clyde Bogart, Seminole, Okla.

Application September 11, 1933, Serial No. 689,038

1 Claim. (Cl. 285—162)

This invention relates to expansion joints and has for the primary object the provision of a device of the above stated character which will allow for expansion and contraction in pipe lines carrying high pressures, obviating the necessity of constructing lines with slack therein and the expense incident to such construction.

Another object of this invention is the provision of a joint of the above stated character which will be simple, durable and capable of having certain packing thereof replaced while in use in a pipe line without the necessity of draining the line or the loss of fluid pressure from the line.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an expansion joint constructed in accordance with my invention.

Figure 2 is a vertical sectional view illustrating the same.

Figure 3 is a plan view illustrating the male member of the joint.

Referring in detail to the drawing, the numeral 1 indicates an expansion joint especially adapted for high pressure lines and consists of a female member 2 and a male member 3. The members 2 and 3 are threaded, as shown at 4, for connecting them to a pipe line. The member 3 extends a considerable distance in the member 2 and the inner end thereof is screw threaded on which is mounted collars 5 retaining therebetween and upon the member 3 a series of packing cups 6 adapted to contact with the inner wall of the female member to prevent fluid pressure from passing between the female member and the male member, the latter being spaced from the walls of a portion thereof, as clearly shown in Figure 2. The female member includes sections 7 and 8. The section 8 has frictional contact with the male member 3 while the section 7 is spaced therefrom. The adjacent ends of the sections 7 and 8 are screw threaded to have threaded thereto a collar 9 whereby the sections may be adjusted endwise relative to each other and also for retaining packing elements 10 in engagement with the adjacent ends of the sections 7 and 8 and the male member 3. The packing elements are arranged in abutting engagement with each other and with the adjacent ends of the sections 7 and 8 and the section 8 at its connected end is concaved to form a seat for one of the packing elements 10, the latter-named packing element being shaped to fit within the seat. By adjusting the sections 7 and 8 towards each other by the collar 9 the packing elements will be forced into engagement with each other and also with the sections of the female member and in engagement with the male member 3.

The free end of the section 8 of the female member is screw threaded to have threaded connection with a gland 11 carrying a packing between itself and the end of the section 8 and the male member 3.

A construction in accordance with the foregoing will permit expansion and contraction in a pipe line due to the fact that the male member may slide within the female member without loss of pressure between the male and female members. Further, it is to be noted that the fluid may flow freely through the joint without obstruction.

When it is necessary to renew the packing in the gland 11 it is not necessary to drain the pipe line due to the fact that the packing elements 10 and packing cups 6 will prevent the escape of the fluid pressure. This arrangement will provide a large saving in oil lines wherein excessive pressures are to be contended with requiring the renewal of packing at frequent intervals. A joint of this character is especially adaptable for oil lines permitting such lines to be constructed without slack consequently rendering a large saving in pipe material and permits the pipe line to readily expand and contract.

During the use of the device, the collar 9 is adjusted so that the packing elements 10 lightly engage the male element 3 and the gland is turned tight to prevent escape of fluid at the joint. However, when the packing of the gland loses its life the collar 9 is adjusted to tighten the packing element 10 against the male element so that the gland can be removed and repacked. After the repacking of the gland the collar 9 is again adjusted to slacken the packing elements on the male element 3.

While I have shown and described the preferred embodiment of my invention, it will be understood that minor changes in construction, combination and arrangement of parts may be made without departing from the spirit and scope of my invention, as claimed.

Having described the invention, I claim:

An expansion joint comprising an elongated tubular female member including detachably connected sections of different diameters, an elongated tubular male member extending into said sections and frictionally contacting with one of said sections throughout the length of the latter and spaced from the other section, packing cups removably mounted on the male member and contacting with the last-named section, a collar detachably connecting the sections together, packing supported by said collar and engaging the adjacent ends of the sections and engaging with the male member, and a packing gland detachably and adjustably connected to the end of one of said sections and having the male member extending therethrough.

CLYDE BOGART.